(12) United States Patent
Juk et al.

(10) Patent No.: US 11,585,652 B2
(45) Date of Patent: Feb. 21, 2023

(54) IMAGING DEVICE, BUMP INSPECTION DEVICE, AND IMAGING METHOD

(71) Applicant: NIDEC READ CORPORATION, Kyoto (JP)

(72) Inventors: Alexsandr Juk, Baie d Urfe (CA); Alain Ross, Baie d Urfe (CA); Takashi Miyasaka, Baie d Urfe (CA); Takeya Tsukamoto, Kyoto (JP); Shigeya Kikuta, Kyoto (JP)

(73) Assignee: NIDEC READ CORPORATION, Muko (JP)

( * ) Notice: Subject to any disclaimer, the term of this patent is extended or adjusted under 35 U.S.C. 154(b) by 214 days.

(21) Appl. No.: 16/631,844

(22) PCT Filed: Dec. 26, 2017

(86) PCT No.: PCT/JP2017/046718
§ 371 (c)(1),
(2) Date: Jan. 17, 2020

(87) PCT Pub. No.: WO2019/016978
PCT Pub. Date: Jan. 24, 2019

(65) Prior Publication Data
US 2020/0166334 A1    May 28, 2020

(30) Foreign Application Priority Data
Jul. 19, 2017   (JP) .............................. JP2017-140202

(51) Int. Cl.
| | | |
|---|---|---|
| *G01B 11/25* | (2006.01) | |
| *G06T 7/00* | (2017.01) | |
| *H04N 5/225* | (2006.01) | |

(52) U.S. Cl.
CPC ........ *G01B 11/2522* (2013.01); *G06T 7/0004* (2013.01); *H04N 5/2256* (2013.01); *G06T 2207/30148* (2013.01)

(58) Field of Classification Search
CPC ................. G06T 7/0002; G06T 7/0004; G06T 2207/30108; G06T 2207/30148;
(Continued)

(56) References Cited

U.S. PATENT DOCUMENTS

| | | |
|---|---|---|
| 5,986,763 A | 11/1999 | Inoue |
| 6,437,355 B1 | 8/2002 | Nishino |

(Continued)

FOREIGN PATENT DOCUMENTS

| | | |
|---|---|---|
| JP | 2001298036 A | 10/2001 |
| JP | 2006090918 A | 4/2006 |

(Continued)

*Primary Examiner* — Maria E Vazquez Colon
(74) *Attorney, Agent, or Firm* — Viering, Jentschura & Partner mbB

(57) ABSTRACT

A bump inspection device images a wafer that includes a plurality of bumps arranged in parallel to each other. Each of the bumps is elongated along a first direction that is along a substrate surface. The bump inspection device includes: a laser-light source that emits laser light in a direction that is inclined relative to the substrate surface; a camera that images the substrate surface onto which the laser light is emitted; and a direction adjusting portion that adjusts an arrangement relation between the direction in which the laser light is emitted and an orientation of the wafer to allow the first direction to become inclined relative to the direction in which the laser light is emitted, in a plan view. The camera images the wafer while the first direction is inclined relative to the direction in which the laser light is emitted, in a plan view.

8 Claims, 10 Drawing Sheets

(58) Field of Classification Search
CPC .. G01B 11/2522; G01B 11/25; H04N 5/2256; G01N 21/8806; G01N 21/956; G01N 21/95684

See application file for complete search history.

(56) References Cited

U.S. PATENT DOCUMENTS

| | | | |
|---|---|---|---|
| 8,202,764 B2 | 6/2012 | Jeong | |
| 8,436,890 B2 | 5/2013 | Mamiya | |
| 10,532,948 B2 | 1/2020 | Rozbicki et al. | |
| 2002/0162979 A1* | 11/2002 | Kusunose | G01N 21/8901 250/559.45 |
| 2009/0103080 A1* | 4/2009 | Oomori | G01N 21/21 356/237.5 |
| 2009/0123060 A1 | 5/2009 | Liu et al. | |
| 2009/0209061 A1* | 8/2009 | Jeong | H01L 24/91 257/E21.602 |
| 2016/0204041 A1* | 7/2016 | Kim | H01L 22/12 438/14 |

FOREIGN PATENT DOCUMENTS

| | | | |
|---|---|---|---|
| JP | 2006275529 A | | 10/2006 |
| JP | 2009130074 A | | 6/2009 |
| JP | 2010091343 A | | 4/2010 |
| JP | 2010096596 A | * | 4/2010 |
| JP | 2010096596 A | | 4/2010 |
| JP | 2011149951 A | | 8/2011 |
| JP | 2012167967 A | | 9/2012 |
| JP | 2012253274 A | | 12/2012 |
| TW | 565681 B | | 12/2003 |

\* cited by examiner

IMAGING DEVICE, BUMP INSPECTION DEVICE, AND IMAGING METHOD

CROSS-REFERENCE TO RELATED APPLICATIONS

The present application is a national stage entry according to 35 U.S.C. § 371 of PCT application No. PCT/JP2017/046718, filed on Dec. 26, 2017, which claims priority from Japanese Application No. 2017-140202, filed on Jul. 19, 2017; the disclosures of each are incorporated herein by reference.

TECHNICAL FIELD

The present disclosure relates to an imaging device, a bump inspection device, and an imaging method.

BACKGROUND

It is known that some conventional inspection devices inspect a semiconductor wafer that includes chips on a surface of the semiconductor wafer. The chips are arranged in lines along an X direction and are arranged in lines along a Y direction in a matrix. The conventional inspection devices inspect the semiconductor wafer by emitting inspection light onto the semiconductor wafer in the X direction or the Y direction in a plan view, and detecting the emitted inspection light that has been reflected.

Electrodes may be formed on a surface of a substrate, such as a wafer. The electrodes protrude from the surface and are often called bumps. The bumps have various shapes. An elongated bump is widely used. Such an elongated bump is usually disposed in such a manner that a direction along a long side of the elongated bump is along an X direction or a Y direction. The X direction and the Y direction are along sides of a square chip. If a plurality of such elongated bumps are arranged, the plurality of elongated bumps are arranged parallel to each other, and are arranged in a line that is perpendicular to a direction along a long side of each of the elongated bumps.

In recent years, a substrate has been sophisticated. Therefore, if a plurality of elongated bumps are arranged in a line along a Y direction in such a manner that long sides of the elongated bumps are along an X direction and the elongated bumps are parallel to each other, for example, a bump pitch becomes narrow. Therefore, when an inspection device such as described above emits inspection light in a Y direction in a plan view, the inspection light emitted into a narrow space between bumps is reflected several times between the bumps. If such inspection light that has been reflected several times is detected, the inspection light may be wrongly recognized in such a manner that a bump exists between a space between bumps, and bumps that are adjacent to each other connect with each other.

SUMMARY

An imaging device according to an aspect of the present disclosure is for imaging a substrate that includes a plurality of bumps arranged in parallel to each other. Each of the bumps is elongated along a first direction that is predetermined and is along a substrate surface. The imaging device includes: a light emitting portion that emits light in a direction that is inclined relative to the substrate surface; an imaging portion that images the substrate surface onto which the light is emitted; and a direction adjusting portion that adjusts an arrangement relation between the direction in which the light is emitted and an orientation of the substrate to allow the first direction to become inclined relative to the direction in which the light is emitted, in a plan view. The imaging portion images the substrate while the first direction is inclined relative to the direction in which the light is emitted, in a plan view.

Further, an imaging method according to an aspect of the present disclosure is for imaging a substrate that includes a plurality of bumps arranged in parallel to each other. Each of the bumps is elongated along a first direction that is predetermined and is along a substrate surface. The imaging method includes: (A) a light emitting step that emits light in a direction that is inclined relative to the substrate surface; (B) an imaging step that images the substrate surface onto which the light is emitted; and (C) a direction adjusting step that adjusts an arrangement relation between the direction in which the light is emitted and an orientation of the substrate to allow the first direction to become inclined relative to the direction in which the light is emitted, in a plan view. The imaging step (B) images the substrate while the first direction is inclined relative to the direction in which the light is emitted, in a plan view.

Further, an imaging device according to an aspect of the present disclosure is for imaging a substrate that includes bumps that are on a substrate surface and are arranged at positions that correspond to points of intersection of a grid. The imaging device includes: a light emitting portion that emits light in a direction that is inclined relative to the substrate surface; an imaging portion that images the substrate surface onto which the light is emitted; and a direction adjusting portion that adjusts an arrangement relation between the direction in which the light is emitted and an orientation of the substrate to allow a diagonal direction that passes through diagonal positions of the grid to substantially correspond to the direction in which the light is emitted, in a plan view. The imaging portion images the substrate while the diagonal direction substantially corresponds to the direction in which the light is emitted, in a plan view.

Further, an imaging method according to an aspect of the present disclosure is for imaging a substrate that includes bumps that are on a substrate surface and are arranged at positions that correspond to points of intersection of a grid. The imaging method includes: (A) a light emitting step that emits light in a direction that is inclined relative to the substrate surface; (B) an imaging step that images the substrate surface onto which the light is emitted; and (C) a direction adjusting step that adjusts an arrangement relation between the direction in which the light is emitted and an orientation of the substrate to allow a diagonal direction that passes through diagonal positions of the grid to substantially correspond to the direction in which the light is emitted, in a plan view. The imaging step (B) images the substrate while the diagonal direction substantially corresponds to the direction in which the light is emitted, in a plan view.

Further, a bump inspection device according to an aspect of the present disclosure includes: one of the imaging devices described above; and an inspection controlling portion that inspects the plurality of bumps, based on images captured by the imaging portion.

The above and other elements, features, steps, characteristics and advantages of the present disclosure will become more apparent from the following detailed description of the preferred embodiments with reference to the attached drawings.

BRIEF DESCRIPTION OF THE DRAWINGS

In the drawings, like reference characters generally refer to the same parts throughout the different views. The drawings are not necessarily to scale; emphasis instead generally being placed upon illustrating the principles of the disclosed embodiments. In the following description, various embodiments described with reference to the following drawings, in which.

DETAILED DESCRIPTION

Hereinafter, embodiments of the present disclosure will be described with reference to the accompanying drawings. In the accompanying drawings, like parts are designated by like reference signs, and redundant description thereof will be omitted.

Figure 1:
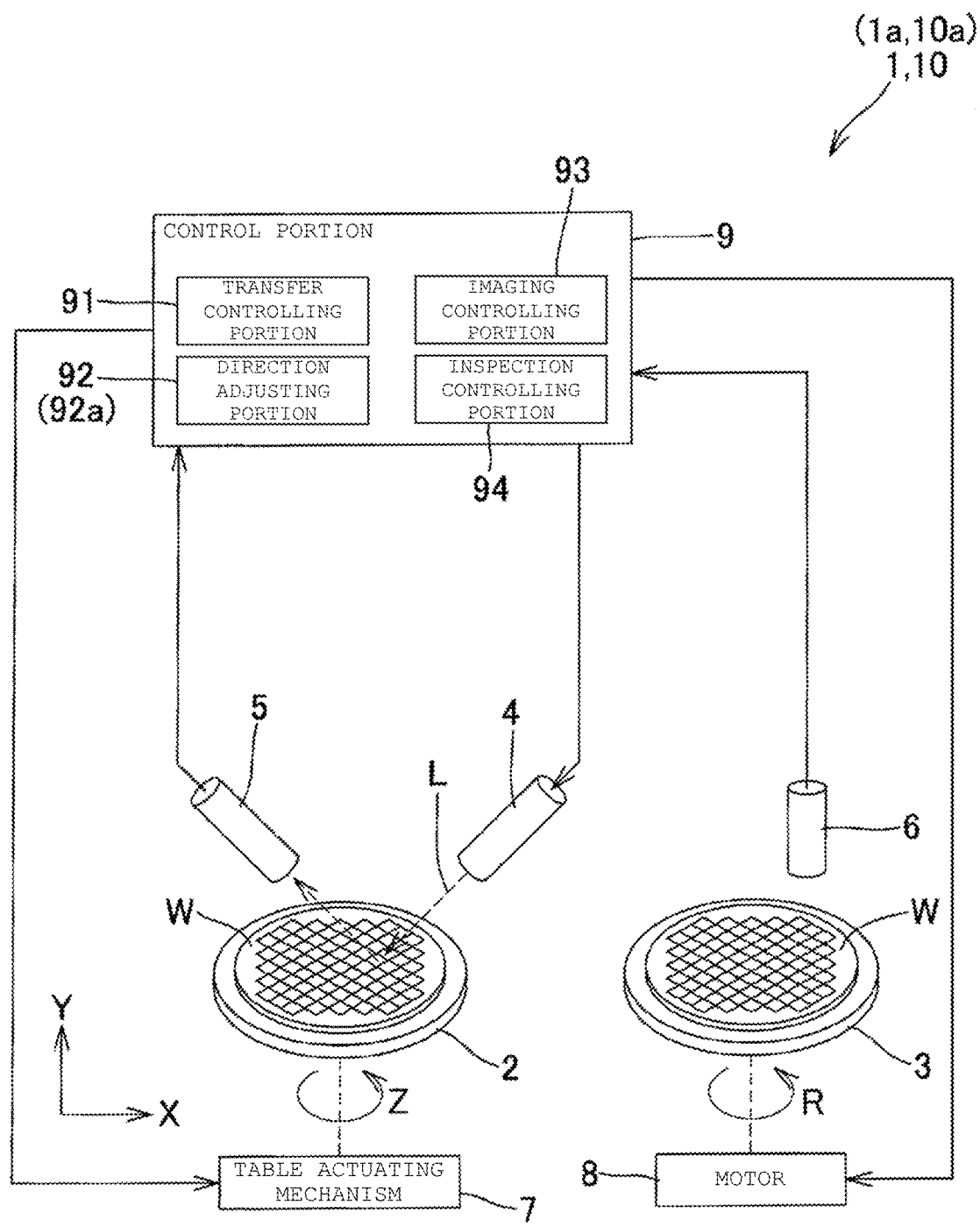
FIG. 1 is a schematic explanatory diagram that illustrates an example of configurations of a bump inspection device that includes an imaging device according to a first embodiment of the present disclosure.

FIG. 1 is a schematic explanatory diagram that illustrates an example of configurations of a bump inspection device that includes an imaging device according to a first embodiment of the present disclosure.

FIG. 1 illustrates a bump inspection device 1 that inspects bumps formed on a semiconductor wafer W that is an example of a substrate. The bump inspection device 1 inspects not only a semiconductor wafer but also other substrates. For example, the other substrates may include a printed wiring board, a glass-epoxy board, a flexible printed circuit, a ceramic multi-layer wiring board, an electrode board for displays, such as a liquid-crystal display and an electro-luminescence (EL) display, a transparent conductive plate for a touch screen, a circuit board and a carrier film for a packaged semiconductor, and semiconductor substrates, such as a semiconductor wafer, a semiconductor chip, and a chip-size package (CSP).

The bump inspection device 1 illustrated in FIG. 1 includes an inspection table 2, a rotatable support 3, a laser-light source 4 (a light emitting portion), a camera 5 (an imaging portion), an orientation detecting portion 6, a table actuating mechanism 7, a motor 8, and a control portion 9. An X axis and a Y axis are set in advance for the bump inspection device 1. The X axis and the Y axis are perpendicular to each other in a horizontal plane.

Figure 2:
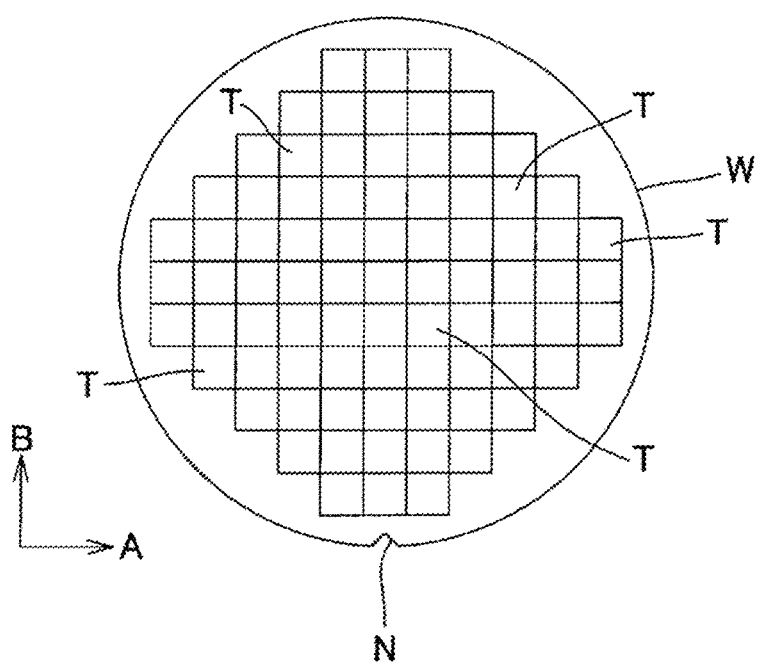
FIG. 2 is a top view of a wafer to be inspected.
Figure 3:
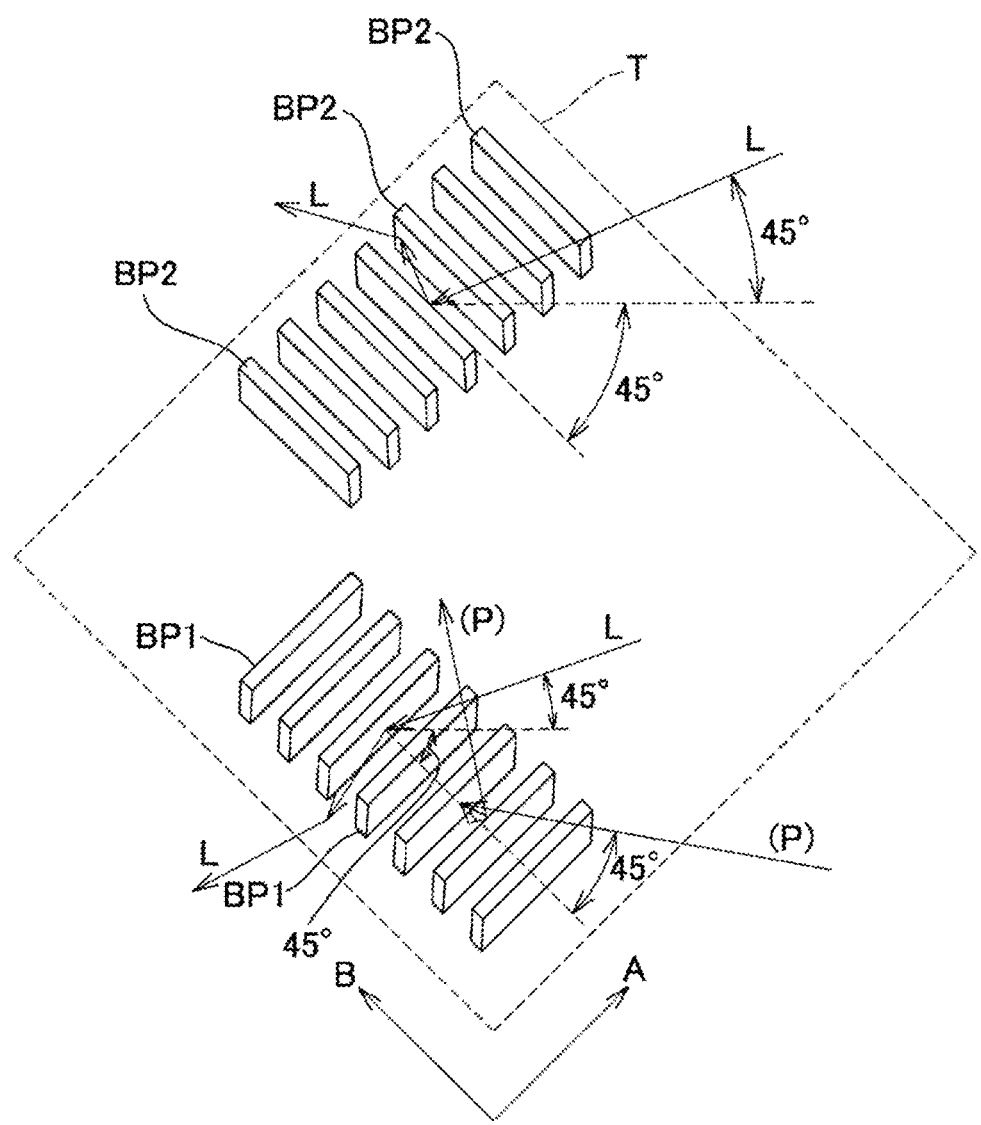
FIG. 3 is a partial enlarged view in which one of chips formed on the wafer illustrated in FIG. 2 is enlarged.

FIG. 2 is a top view of a wafer W to be inspected. The wafer W has a shape like a disk. The wafer W includes a plurality of chips T on a top surface of the wafer W. The chips T are arranged in a matrix. Each of the chips T has a substantially square shape. FIG. 3 is a partial enlarged view in which one of the chips T formed on the wafer W illustrated in FIG. 2 is enlarged.

On the chip T, a plurality of bumps BP1 are arranged in a line along a second direction B that is perpendicular to a first direction A that is along a substrate surface of the wafer W. Each of the bumps BP1 is elongated along the first direction A. The bumps BP1 are parallel to each other. Further, on the chip T, a plurality of bumps BP2 are arranged in a line along the first direction A. Each of the bumps BP2 is elongated along the second direction B that is along the substrate surface of the wafer W. The bumps BP2 are parallel to each other.

In an example illustrated in FIG. 3, the chip T has two sides that are parallel to each other and each extend in a direction that is along the first direction A. The two other sides of the chip T each extend in a direction that is along the second direction B. In an example illustrated in FIG. 2, the plurality of chips T are arranged in lines along the first direction A and are arranged in lines along the second direction B in a matrix. A periphery of the wafer W has a notch N. Consequently, an orientation of the wafer W is detected by detecting the notch N. The wafer W may have an orientation flat instead of the notch N.

The rotatable support 3 substantially has a shape like a disk. A wafer W to be inspected is disposed on a top surface of the rotatable support 3. An orientation detecting portion 6 detects a notch N of a wafer W disposed on the rotatable support 3, and outputs, to the control portion 9, a signal due to the detection. The signal due to the detection is information that shows an orientation of the wafer W. The orientation detecting portion 6 includes a charge-coupled-device (CCD) camera or a photosensor, for example.

The orientation detecting portion 6 only needs to detect an orientation of a wafer W on the rotatable support 3. The orientation detecting portion 6 uses any method to detect a wafer W on the rotatable support 3. For example, the orientation detecting portion 6 may use an orientation flat to detect an orientation of a wafer W. Alternatively, the orientation detecting portion 6 may output, to the control portion 9, images of bumps or a pattern formed on a surface of a substrate. The images of bumps or the pattern formed on a surface of a substrate are information that shows an orientation of the substrate.

The motor 8 is a stepping motor, for example. The motor 8 rotates the rotatable support 3 in response to control signals from the control portion 9 to the motor 8. Consequently, a wafer W disposed on a top surface of the rotatable support 3 rotates about a rotational axis that is perpendicular to a substrate surface of the wafer W.

The inspection table 2 substantially has a shape like a disk. A wafer W to be inspected is disposed on a top surface of the inspection table 2. A transfer mechanism not illustrated transfers, from the rotatable support 3 to a top surface of the inspection table 2, a wafer W whose orientation has been adjusted on the rotatable support 3, while the transfer mechanism not illustrated maintains the adjusted orientation of the wafer W.

The laser-light source 4 and the camera 5 are arranged above the inspection table 2. The laser-light source 4 emits laser light L onto a top surface of a wafer W disposed on the inspection table 2. For example, an angle between laser light L emitted from the laser-light source 4 and a surface of a wafer W is 45°. Further, the laser light L is along an X-axis direction, for example, in a plan view in which the laser light L is seen in a direction that is perpendicular to a substrate surface of the wafer W. In that case, in a plan view, a direction in which laser light is emitted is the X-axis direction.

The laser-light source is exemplified as an example of the light emitting portion. The light emitting portion only needs to have a directivity that allows the light emitting portion to emit light in a predetermined direction. The light emitting portion is not necessarily limited to the laser-light source. For example, the light emitting portion may include a combination of a light source and an optical system, such as lenses and concave mirrors.

Further, the light emitting portion may emit light that has a shape like a belt, that is to say, light that has a width increased in a direction perpendicular to a direction in which the light is emitted. In that case, a movement pitch used to scan a substrate surface with light is increased. Therefore, a time required to scan the substrate surface with light becomes short.

The table actuating mechanism 7 repeatedly moves the inspection table 2 in the X-axis direction and a Y-axis direction. Consequently, a surface of a wafer W is scanned with laser light L.

The camera 5 includes a CCD, for example. The camera 5 images a surface of a wafer W scanned with laser light L. The camera 5 generates a three-dimensional image of a surface of a wafer W, based on, for example, a positional relation between a position of the inspection table 2 actuated by the table actuating mechanism 7 (position of the wafer W) and an image of laser light L that has been reflected and is imaged by the camera 5.

The control portion 9 includes, for example, a central processing unit (CPU) that performs predetermined logical operations, random-access memory (RAM) that temporarily stores data, a storage portion that is nonvolatile and stores predetermined control program, etc., and peripheral circuits for the CPU, the RAM, and the storage portion. The control portion 9 performs the predetermined control program to function as a transfer controlling portion 91, a direction adjusting portion 92, an imaging controlling portion 93, and an inspection controlling portion 94.

A bump inspection device 1 from which the inspection controlling portion 94 is eliminated corresponds to an imaging device 10 according to an embodiment of the present disclosure.

For example, the transfer controlling portion 91 controls operations of a transfer mechanism not illustrated to transfer a wafer W to be inspected onto the rotatable support 3. The rotatable support 3 adjusts an orientation of the wafer W. Then the transfer controlling portion 91 controls operations of the transfer mechanism not illustrated to transfer the wafer W from the rotatable support 3 onto the inspection table 2, while the transfer mechanism not illustrated maintains the adjusted orientation of the wafer W. Various transfer units, such as a robot arm, may be used as the transfer mechanism.

The direction adjusting portion 92 rotates the rotatable support 3 by controlling rotation of the motor 8, based on information that has been output from the orientation detecting portion 6 to the control portion 9 and shows an orientation of the wafer W. Consequently, the direction adjusting portion 92 adjusts an orientation of the wafer W. Consequently, a first direction A of the wafer W becomes inclined at an angle of substantially 45° relative to the X-axis direction. The X-axis direction corresponds to a direction in which laser light is emitted, in a plan view in which the direction in which laser light is emitted is seen in a direction that is perpendicular to a substrate surface of the wafer W. The transfer mechanism not illustrated transfers, from the rotatable support 3 onto the inspection table 2, the wafer W whose orientation has been adjusted by the rotatable support 3, while the transfer mechanism not illustrated maintains the adjusted orientation of the wafer W. Therefore, the direction adjusting portion 92 adjusts an arrangement relation between a direction in which laser light L is emitted and an orientation of the wafer W. Consequently, the first direction A becomes inclined at an angle of substantially 45° relative to the direction in which laser light L is emitted, in a plan view in which the wafer W is seen in a direction that is perpendicular to a substrate surface of the wafer W.

The terms "an angle of substantially 45°" mean that some allowable ranges, such as a margin of error of control performed by the direction adjusting portion 92 are allowed. Further, the terms "an angle of substantially 45°" mean a range of angles from −10% to +10% (from 40.5° to 49.5°), for example.

The imaging controlling portion 93 allows the laser-light source 4 to emit laser light L onto a wafer W disposed on the inspection table 2, while the imaging controlling portion 93 allows the table actuating mechanism 7 to move the inspection table 2. Consequently, the imaging controlling portion 93 scans a surface of the wafer W with the laser light L. Further the imaging controlling portion 93 allows the camera 5 to image the surface of the wafer W scanned with the laser light L.

The inspection controlling portion 94 inspects bumps BP1, BP2, based on images captured by the camera 5.

Figure 4:
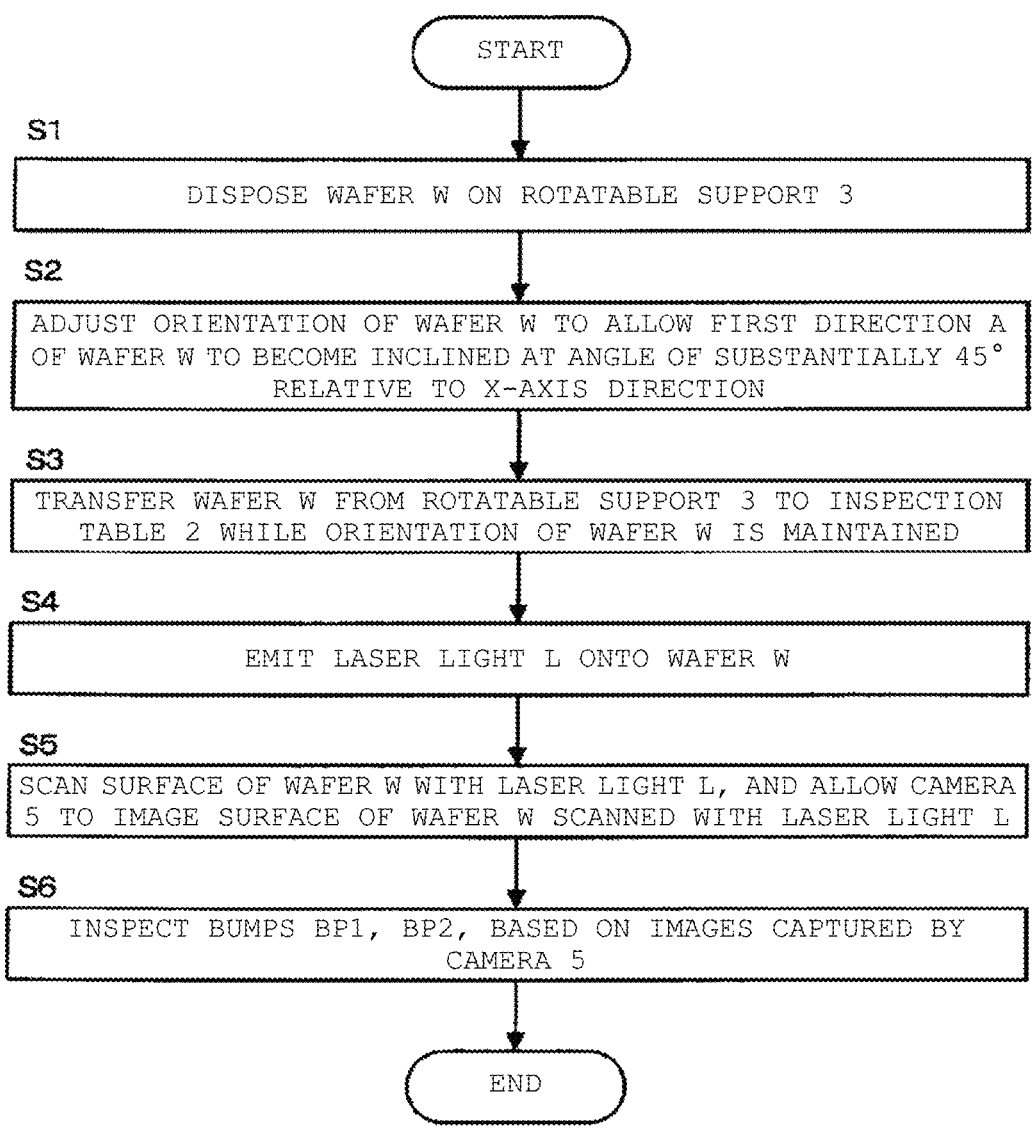
FIG. 4 is a flowchart that illustrates an example of operations of the bump inspection device illustrated in FIG. 1.

Next, an example of operations of the bump inspection device 1 configured as described above will be described. FIG. 4 is a flowchart that illustrates an example of operations of the bump inspection device 1 illustrated in FIG. 1. First, the transfer controlling portion 91 allows the transfer mechanism not illustrated to transfer a wafer W to be inspected onto the rotatable support 3 (step S1).

Next, the direction adjusting portion 92 adjusts an orientation of the wafer W, based on results of detection performed by the orientation detecting portion 6. Consequently, a first direction A of the wafer W becomes inclined at an angle of substantially 45° relative to the X-axis direction of the bump inspection device 1 (step S2). The X-axis direction of the bump inspection device 1 is same as a direction in which laser light is emitted, if the direction in which laser light is emitted is seen in a plan view.

Next, the transfer controlling portion 91 allows the transfer mechanism not illustrated to transfer, from the rotatable support 3 onto the inspection table 2, the wafer W on the rotatable support 3, while the transfer mechanism not illustrated maintains an orientation of the wafer W (step S3). Steps S2, S3 correspond to an example of a direction adjusting step (C).

Next, the imaging controlling portion 93 allows the laser-light source 4 to emit laser light L onto the wafer W on the inspection table 2 (step S4: a light emitting step (A)).

Figure 5:
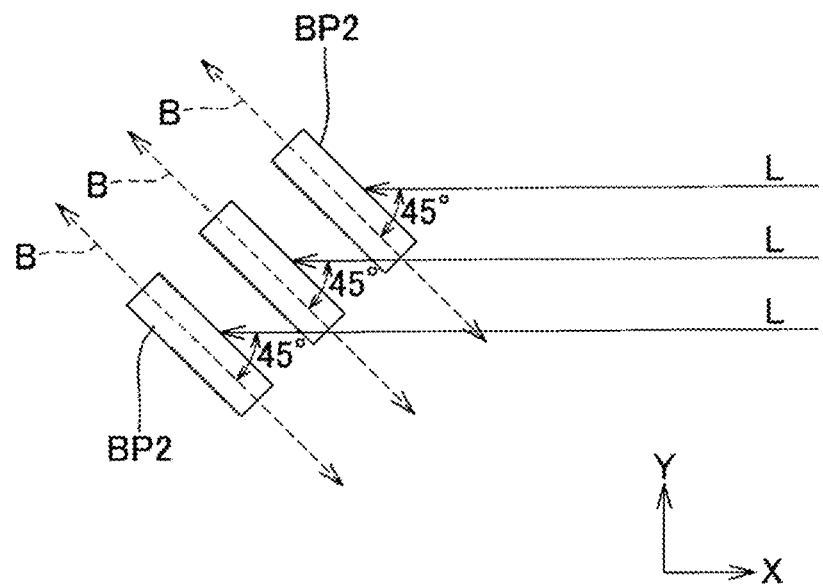
FIG. 5 is an explanatory plan view that illustrates part of a wafer disposed on an inspection table illustrated in FIG. 1.
Figure 5:
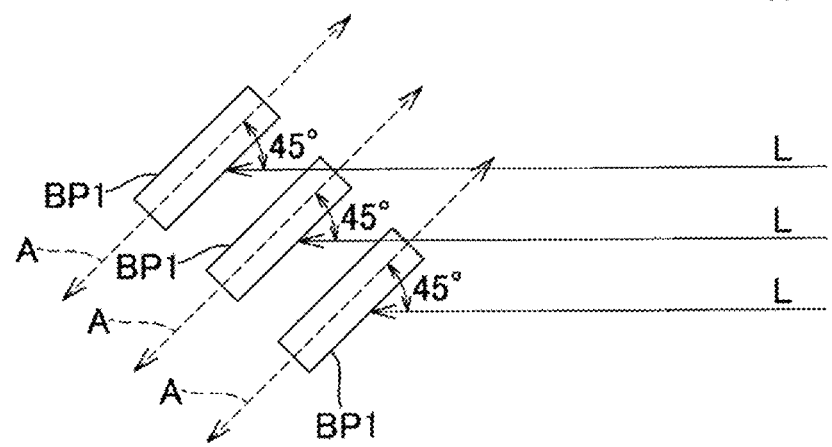

FIG. 5 is an explanatory plan view that illustrates part of a wafer W disposed on the inspection table 2 illustrated in FIG. 1. The wafer W is disposed on the inspection table 2 after an orientation of the wafer W is adjusted by the rotatable support 3. As illustrated in a plan view of FIG. 5, laser light L emitted onto the wafer W is inclined at an angle of 45° relative to a first direction A and relative to a second direction B. The first direction A is a direction along a long side of each of bumps BP1. The second direction B is a direction along a long side of each of bumps BP2. That is to say, an angle at which the first direction A is inclined relative to a direction in which laser light L is emitted is substantially equal to an angle at which the second direction B is inclined relative to the direction in which laser light L is emitted. The terms "substantially equal to" mean that a margin of error is allowed. Further, the terms "substantially equal to" mean that the angle is within a range from −10% to +10%.

In steps S2, S3, an arrangement relation between a direction in which laser light L is emitted and an orientation of a wafer W is adjusted. Consequently, laser light L is emitted to the bumps BP1, BP2 at such an angle.

In the shown example, the first direction A and the second direction B are each inclined at an angle of 45° relative to a direction in which laser light L is emitted. However, an angle at which the first direction A is inclined relative to the direction in which laser light L is emitted only needs to be substantially equal to an angle at which the second direction B is inclined relative to the direction in which laser light L is emitted. An angle at which the first direction A is inclined relative to the direction in which laser light L is emitted and an angle at which the second direction B is inclined relative to the direction in which laser light L is emitted are not limited to an angle of 45°. For example, if the first direction A and the second direction B are each inclined at an angle of 60° relative to the X-axis direction, the first direction A and the second direction B may be each inclined at an angle of 30° relative to a direction in which laser light L is emitted.

Further, an angle at which the first direction A is inclined relative to a direction in which laser light L is emitted is not necessarily equal to an angle at which the second direction B is inclined relative to the direction in which laser light L is emitted. Preferably, however, the first direction A and the second direction B are inclined at an equal angle relative to a direction in which laser light L is emitted. The reason is that bumps BP1 and bumps BP2 are imaged with equal accuracy. Consequently, the bumps BP1 and the bumps BP2 are inspected with equal accuracy.

Further, a wafer W does not necessarily include two kinds of bumps BP1, BP2 that differ in a direction along a long side of each of the bumps BP1, BP2. A wafer W may include only bumps BP1 elongated in the first direction A. Further, laser light L may be emitted in a direction inclined relative to the first direction A. More preferably, laser light L may be emitted in a direction inclined at an angle of substantially 45° relative to the first direction A.

Next, the imaging controlling portion 93 allows the table actuating mechanism 7 to move the inspection table 2 to scan a surface of the wafer W with laser light L. Further, the imaging controlling portion 93 allows the camera 5 to image the surface of the wafer W scanned with the laser light L (step S5: an imaging step (B)).

Figure 6:
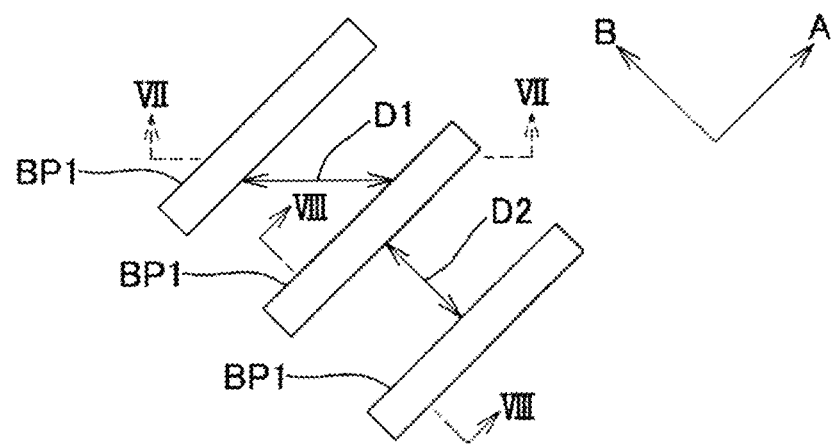
FIG. 6 is an explanatory diagram that illustrates an effect of a direction adjusting step.
Figure 7:
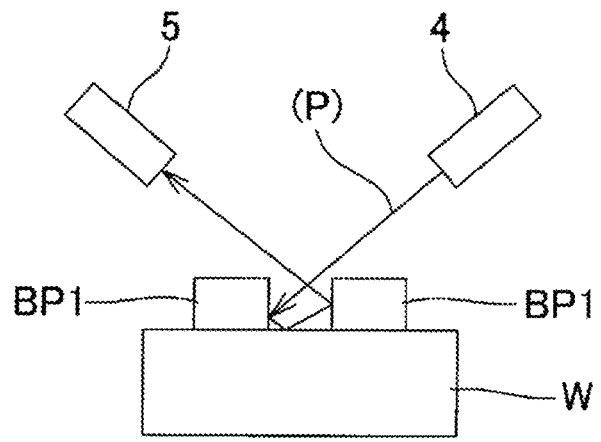
FIG. 7 is an explanatory diagram that illustrates an effect of the direction adjusting step.
Figure 8:
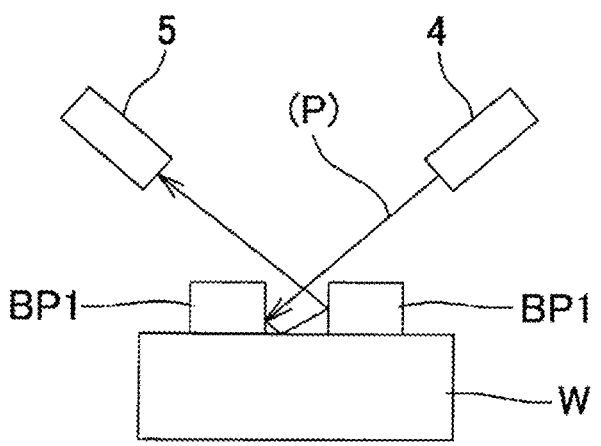
FIG. 8 is an explanatory diagram that illustrates an effect of the direction adjusting step.

FIGS. 6 to 8 are explanatory diagrams that illustrate an effect of the direction adjusting step (C) of steps S2, S3. As illustrated in FIG. 6, if laser light L is emitted in a direction that is inclined relative to the first direction A, a length D1 of a path of laser light L between two bumps BP1 that are adjacent to each other is longer than a distance between bumps BP1 that are adjacent to each other, in a plan view. On the other hand, as in the background art, if laser light L is emitted in a direction that is not inclined relative to the first direction A but is perpendicular to the first direction A, a length D2 of a path of laser light L between two bumps BP1 that are adjacent to each other is equal to a distance between bumps BP1 that are adjacent to each other, in a plan view.

That is to say, the bump inspection device 1 allows the first direction A to be inclined relative to a direction in which laser light L is emitted, in a plan view. Consequently, the bump inspection device 1 has an effect that is substantially same as an effect of an increase in a distance between bumps BP1 that are adjacent to each other. Similarly, the bump inspection device 1 allows the second direction B to be inclined relative to a direction in which laser light L is emitted, in a plan view. Consequently, the bump inspection device 1 has an effect that is substantially same as an effect of an increase in a distance between bumps BP2 that are adjacent to each other. Consequently, even if a substrate that includes a plurality of bumps that are arranged in parallel to each other is imaged, images in which spaces between the bumps are identified are easily captured.

Further, even if widths of bumps BP1, BP2 are narrow, laser light L that is inclined relative to the first direction A and the second direction B in a plan view has an effect that is substantially same as an effect of an increase in widths of the bumps BP1, BP2, compared with a case in which laser light L is emitted in a same direction relative to the first direction A and the second direction B in a plan view. Consequently, even if a wafer is sophisticated and thus widths of bumps BP1, BP2 are narrow, laser light L inclined relative to the first direction A and the second direction B in a plan view allows the bumps BP1, BP2 whose widths are narrow to be easily imaged.

Figure 9:
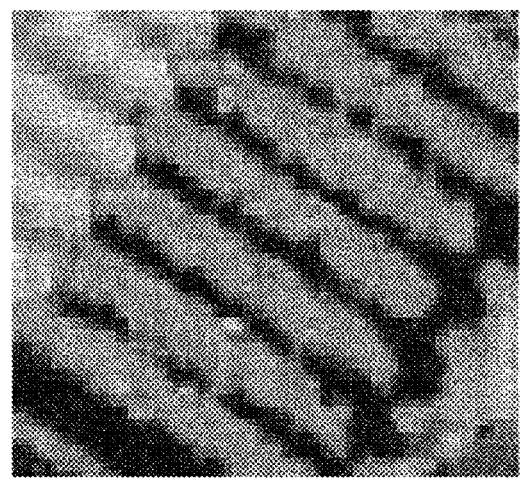
FIG. 9 illustrates an example of images captured by the bump inspection device (imaging device)
Figure 10:
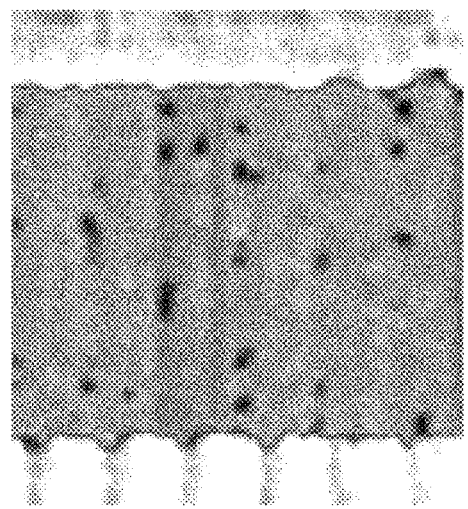
FIG. 10 illustrates an example of images that are captured if a direction in which laser light is emitted onto bumps is along a second direction.

FIG. 7 is a cross-sectional view of bumps BP1 illustrated in FIG. 6. The cross-sectional view is cut along line VII-VII that is along a direction in which laser light L is emitted. FIG. 8 is a cross-sectional view of bumps BP1 illustrated in FIG. 6. The cross-sectional view is cut along line VIII-VIII that is along the second direction B. FIG. 9 corresponds to FIG. 7 and illustrates an example of images captured by the bump inspection device (imaging device 10). FIG. 10 corresponds to FIG. 8 and illustrates an example of images that are captured if a direction in which laser light (P) is emitted onto bumps BP1 is along the second direction B, as shown in the background art.

In FIGS. 3 and 8, laser light (P) designated by sign (P) is emitted in a direction that is not inclined relative to the first direction A but is perpendicular to the first direction A in a plan view, as in the background art. In that case, light is reflected several times between bumps BP1 that are adjacent to each other. The reflected light travels in a direction in which laser light (P) is emitted, in a plan view. That is to say, the reflected light travels toward the camera 5. Consequently, the camera 5 images the light that has been reflected several times. Consequently, the camera 5 may wrongly image bumps BP1 that are adjacent to each other, in such a manner that the bumps BP1 that are adjacent to each other connect with each other in an image, as illustrated in FIG. 10.

On the other hand, with reference to FIGS. 3 and 7, the first direction A is inclined relative to a direction in which laser light L is emitted, in a plan view. In that case, laser light L reflected by a side of a bump BP1 is less likely to be reflected several times between bumps BP1 that are adjacent to each other. Even if laser light L is reflected several times, the laser light L that has been reflected several times is less likely to travel in a direction in which laser light L is emitted, in a plan view. That is to say, the laser light L that has been reflected several times is less likely to travel toward the camera 5. Consequently, the camera 5 is less likely to wrongly image bumps BP1 that are adjacent to each other, in such a manner that the bumps BP1 that are adjacent to each other connect with each other in an image. If laser light L emitted into a space between bumps BP1 that are adjacent to each other does not travel toward the camera 5, as illustrated in FIG. 7, the space becomes like a shadow in an image. Therefore, in the image, the shadow separates bumps BP1 that are adjacent to each other, as illustrated in FIG. 9.

Similarly, regarding bumps BP2, the second direction B is inclined relative to a direction in which laser light L is emitted, in a plan view. Therefore, the camera 5 is less likely to wrongly image the bumps BP2 that are adjacent to each other, in such a manner that the bumps BP2 that are adjacent to each other connect with each other in an image. That is to say, when a substrate that includes a plurality of bumps BP1, BP2 arranged parallel to each other is imaged, images in which spaces between the bumps BP1, BP2 are identified are easily captured.

Next, the inspection controlling portion 94 inspects bumps BP1, BP2, based on images captured by the camera 5 (step S6: an inspection step). For example, the inspection controlling portion 94 compares an image captured by the camera 5 with a standard image of an acceptable wafer W that has been preliminarily captured, and thus determines whether or not the bumps BP1, BP2 are acceptable.

In that case, even if a wafer W is sophisticated and thus distances between bumps BP1, BP2 become short, the bump inspection device 1 easily captures images in which spaces between the bumps BP1, BP2 are identified. Consequently, accuracy of inspection of the bumps BP1, BP2 is easily increased.

The table actuating mechanism 7 may rotate the inspection table 2 about a rotational axis that is perpendicular to a top surface of the inspection table 2, and may include an orientation detecting portion that is similar to the orientation detecting portion 6 and detects an orientation of a wafer W disposed on the inspection table 2. After the rotatable support 3 adjusts an orientation of a wafer W, the direction adjusting portion 92 may adjust the orientation of the wafer W on the inspection table 2 again by rotating the inspection table 2. Consequently, a first direction A and a second direction B become inclined at angle of 45° relative to a direction in which laser light is emitted. Consequently, accuracy of adjustment of an orientation of a wafer W increases.

Further, the bump inspection device 1 may not include the rotatable support 3, and may allow the inspection table 2 to rotate to allow a first direction A and a second direction B to become inclined relative to a direction in which laser light is emitted. In the shown example, the laser-light source 4 emits laser light L in a fixed direction, and an orientation of a wafer W is adjusted. However, an orientation of a wafer W may be fixed, and a direction in which laser light L is emitted may be adjusted. Alternatively, both an orientation of a wafer W and a direction in which laser light L is emitted may be adjusted.

Further the bump inspection device 1 may not include the inspection controlling portion 94, and thus the bump inspection device 1 may be the imaging device 10 that images a substrate.

Next, a bump inspection device 1a that includes an imaging device 10a according to a second embodiment of the present disclosure will be described. FIG. 1 illustrates the bump inspection device 1a and the imaging device 10a, in addition to the bump inspection device 1 and the imaging device 10. Differences between the bump inspection device 1a and the bump inspection device 1 and differences between the imaging device 10a and the imaging device 10 are operations of a direction adjusting portion 92a, and a shape and an arrangement of bumps formed on a wafer W to be inspected. Since other configuration of the bump inspection device 1a and the imaging device 10a is same as other configuration of the bump inspection device 1 and the imaging device 10, the other configuration will not be described. Hereinafter, features of the present embodiment will be described.

Figure 11:
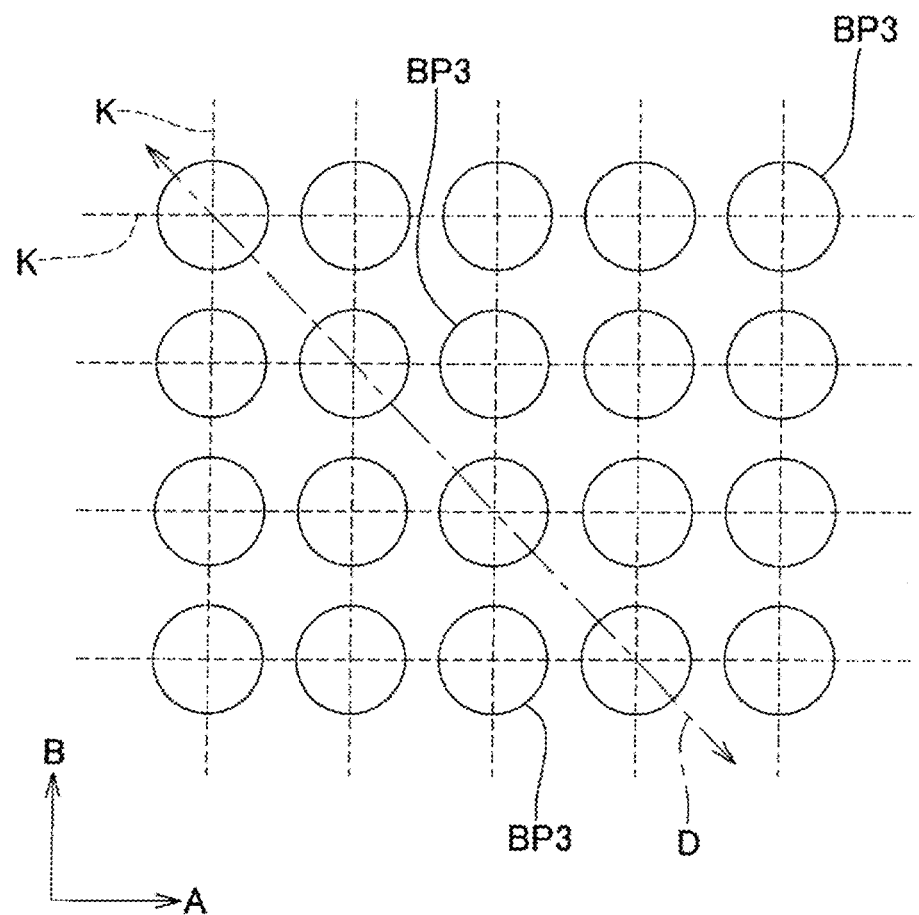
FIG. 11 is an explanatory plan view that illustrates bumps seen in a direction that is perpendicular to a substrate surface of a wafer; the bumps are formed on each of chips of the wafer; and the wafer is imaged by an imaging device. That is to say, the wafer is inspected by a bump inspection device.

FIG. 11 is an explanatory plan view that illustrates bumps BP3 seen in a direction that is perpendicular to a substrate surface of a wafer W. The bumps BP3 are formed on each of chips T of the wafer W. The wafer W is imaged by the imaging device 10a. That is to say, the wafer W is inspected by the bump inspection device 1a. The bumps BP3 are arranged at positions that correspond to points of intersection of a grid K drawn using broken lines. In an example illustrated in FIG. 11, the grid K includes a plurality of lines that extend in a first direction A and a plurality of lines that extend in a second direction B. The plurality of lines that extend in the first direction A intersect with the plurality of lines that extend in the second direction B.

The bumps BP3 may have various shapes, such as a column, a prism, a shape that is like a mushroom that has a round head, a sphere, and a hemisphere. FIG. 11 illustrates a grid of four horizontal lines and five vertical lines, as an example. Grids are not limited to the example. A grid on which bumps are arranged only needs to be a grid of two or more horizontal lines and two or more vertical lines.

The direction adjusting portion 92a adjusts an arrangement relation between a direction in which laser light L is emitted and an orientation of a wafer W. Consequently, a diagonal direction D that passes through diagonal positions of the grid K substantially corresponds to the direction in which laser light L is emitted, in a plan view. The terms "substantially corresponds to" mean that a range of angles between the diagonal direction D and a direction in which laser light L is emitted is from −10° to +10°, for example. The range of angles allows some allowable ranges, such as a margin of error of control performed by the direction adjusting portion 92.

Figure 12:
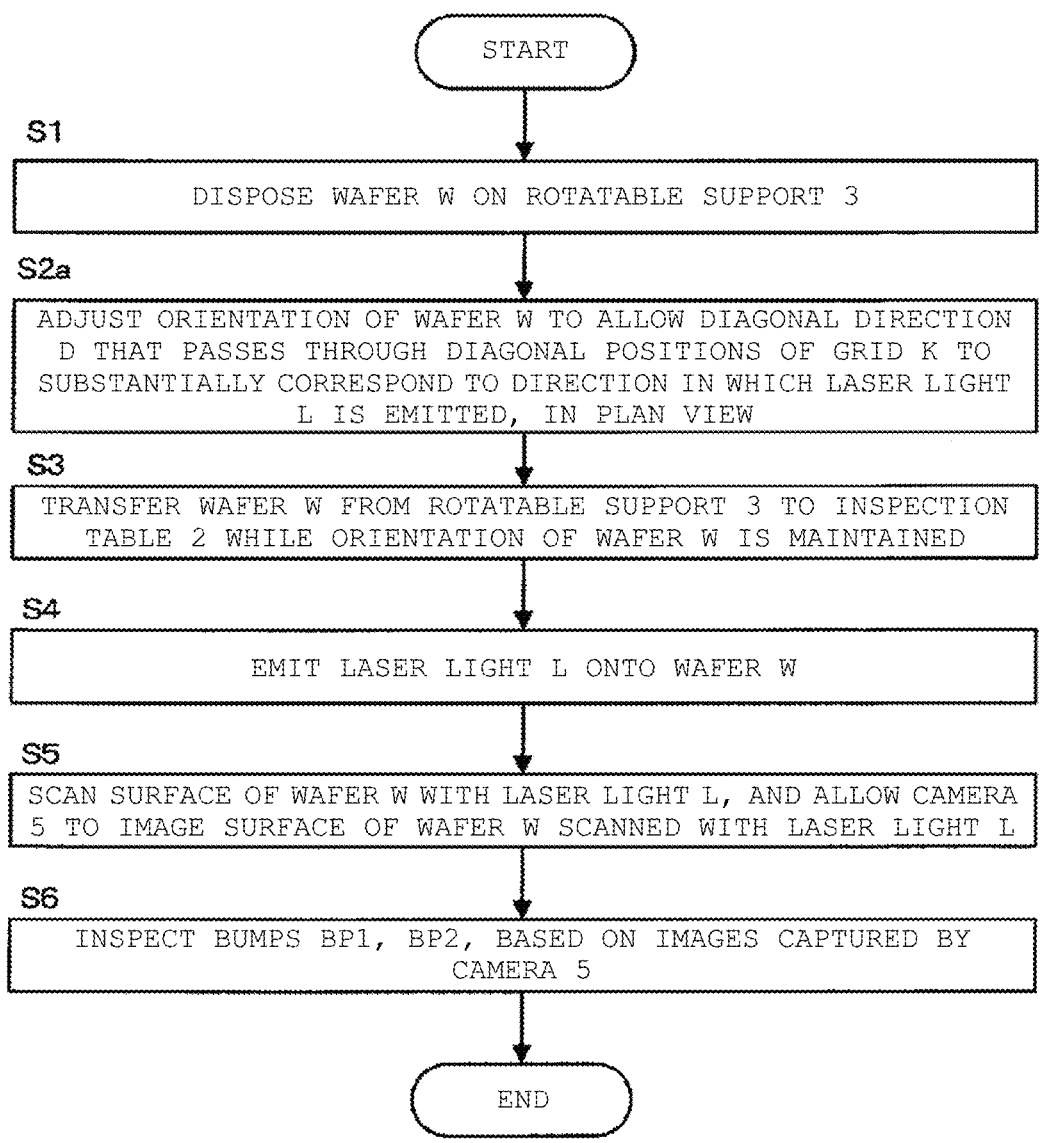
FIG. 12 is a flowchart that illustrates an example of operations of a bump inspection device according to the first embodiment of the present disclosure.

Hereinafter, operations of the bump inspection device 1a that uses an imaging method according to the second embodiment of the present disclosure will be described. FIG. 12 is a flowchart that illustrates an example of operations of the bump inspection device 1a. In the flowcharts of FIGS. 4 and 12, similar operations are designated by same step numbers. Further, redundant description thereof will be omitted.

First, step S1 is performed. Then the direction adjusting portion 92a adjusts an orientation of a wafer W by rotating a rotatable support 3, based on results of detection performed by the orientation detecting portion 6. Consequently, an X-axis direction of the bump inspection device 1a substantially corresponds to a diagonal direction D of the wafer W, in a plan view (step S2a). The X-axis direction of the bump inspection device 1a is same as a direction in which laser light is emitted, if the direction in which laser light is emitted is seen in a plan view.

Next, in step S3, the wafer W is transferred onto an inspection table 2. Then, in step S4, laser light L is emitted along the diagonal direction D onto the wafer W on the inspection table 2.

Figure 13:
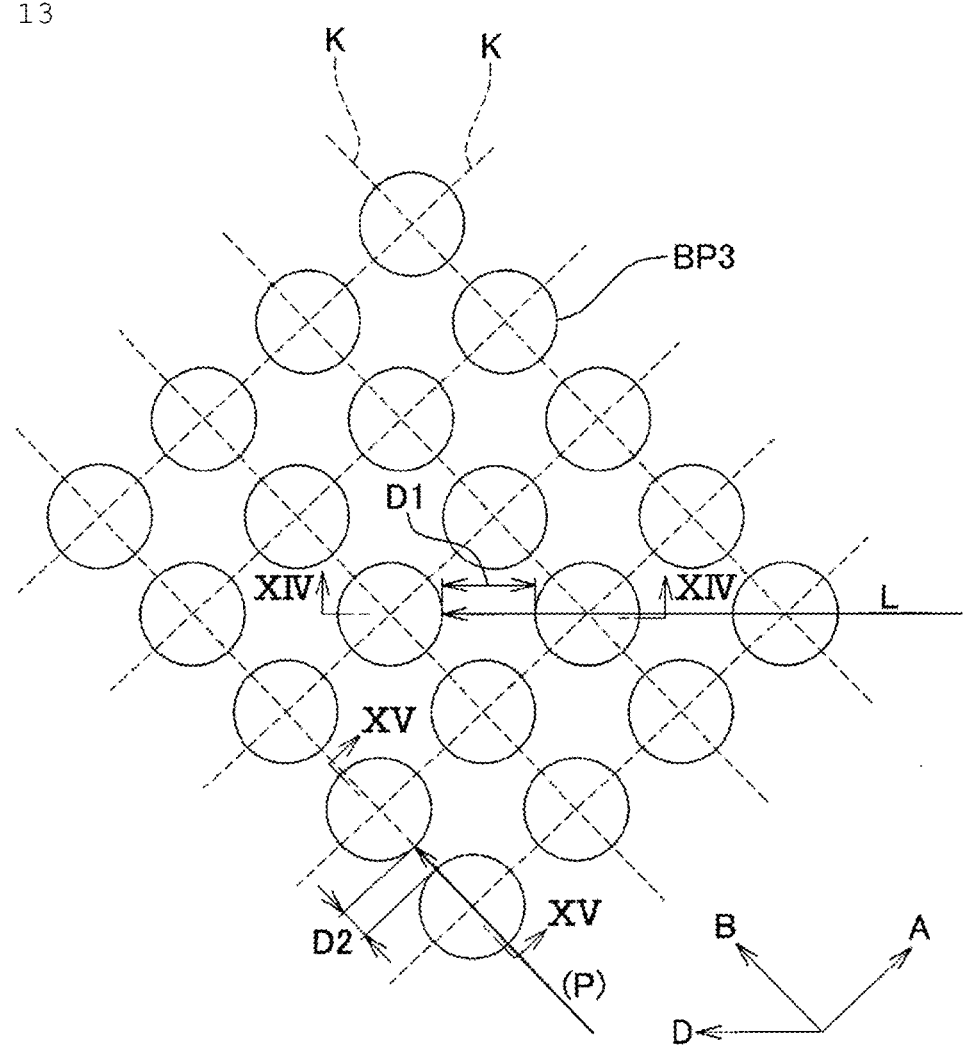
FIG. 13 is an explanatory plan view in which laser light is emitted along a diagonal direction onto a wafer.
Figure 14:
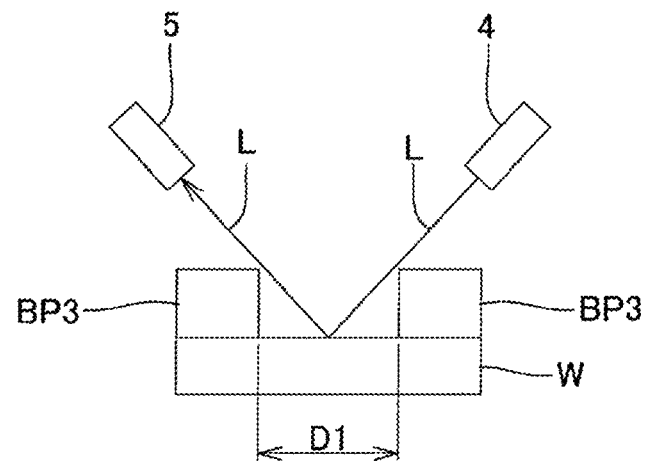
FIG. 14 is a sectional view taken along line XIV-XIV in FIG. 13.
Figure 15:
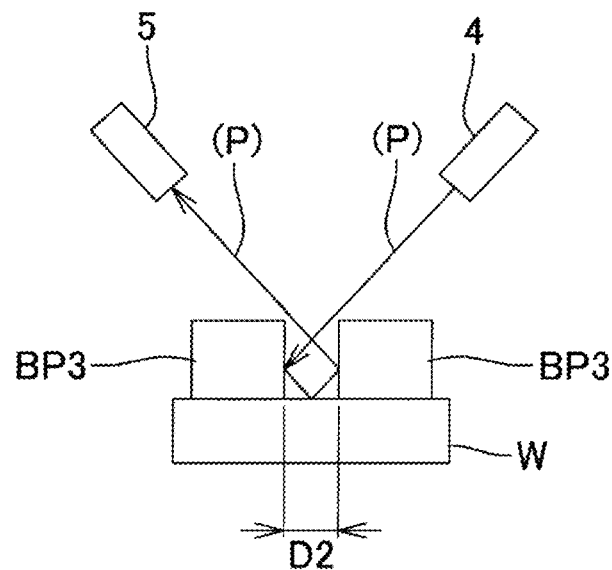
FIG. 15 is a sectional view taken along line XV-XV in FIG. 13.

FIG. 13 is an explanatory plan view in which laser light L is emitted along the diagonal direction D onto a wafer W. FIG. 14 is a sectional view taken along line XIV-XIV in FIG. 13. FIG. 15 is a sectional view taken along line XV-XV in FIG. 13. As illustrated in FIGS. 13 and 14, if laser light L is emitted along the diagonal direction D, a length D1 of a path of laser light L between two bumps BP3 is longer than a distance D2 that is along a line of the grid and is between bumps BP3 that are adjacent to each other, in a plan view. On the other hand, as in the background art illustrated in FIGS. 13 and 15, if laser light (P) is emitted along a second direction B, a length D2 of a path of laser light L between two bumps BP3 that are adjacent to each other is equal to a distance D2 that is along a line of the grid and is between bumps BP3 that are adjacent to each other, in a plan view.

That is to say, the bump inspection device 1a allows a direction in which laser light L is emitted to substantially correspond to the diagonal direction D. Consequently, the bump inspection device 1a has an effect that is substantially same as an effect of an increase in a distance between bumps BP3 that are adjacent to each other.

If laser light (P) is emitted along the second direction B, as in the background art, a camera 5 may image the laser light (P) that has been reflected several times, as illustrated in FIG. 15. In that case, the camera 5 may wrongly image bumps BP3 that are adjacent to each other, in such a manner that the bumps BP3 that are adjacent to each other connect with each other in an image, as illustrated in FIG. 10. On the other hand, if laser light L is emitted along the diagonal direction D, a distance between bumps BP3 that are adjacent to each other substantially increases. Therefore, the camera 5 is more likely to image laser light L that has been reflected by a surface of a wafer W in a space between bumps BP3, as illustrated in FIG. 14. In that case, surfaces of the wafer W in spaces between the bumps BP3 are correctly imaged. Consequently, images in which spaces between the bumps BP3 are identified are easily captured.

Figure 16:
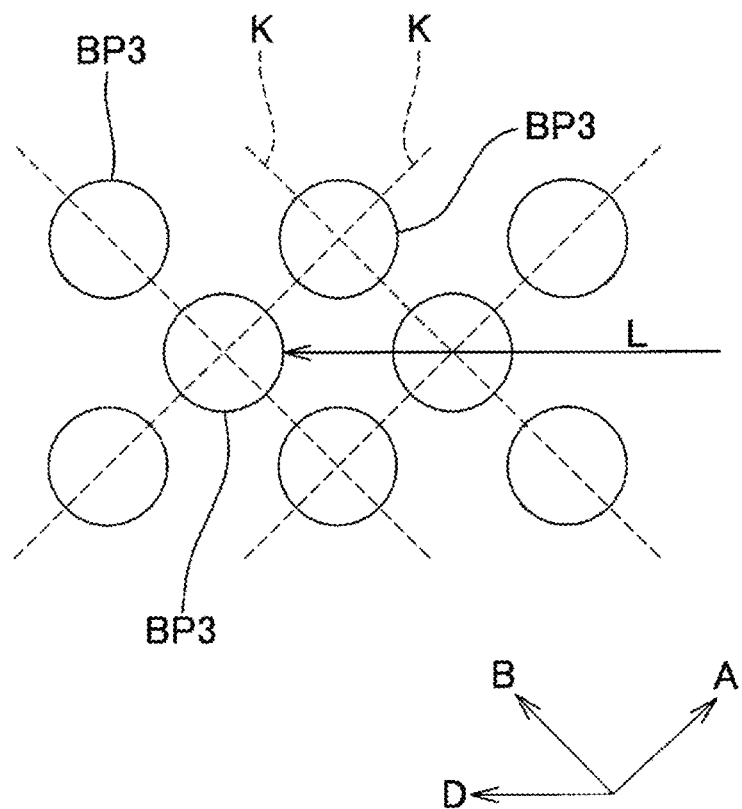
FIG. 16 is an explanatory diagram that illustrates another example of an arrangement of the bumps illustrated in FIG. 11.

Bumps BP3 may be arranged as illustrated in FIG. 16, for example.

Further, an arrangement relation between a direction in which laser light L is emitted and an orientation of a wafer W is adjusted by rotating the rotatable support and thus rotating a wafer W, in the above embodiments. However, the present disclosure is not limited to the example. More specifically, an arrangement relation between a direction in which laser light L is emitted and an orientation of a wafer W may be adjusted by rotating the laser-light source.

That is to say, an imaging device according to an aspect of the present disclosure is for imaging a substrate that includes a plurality of bumps arranged in parallel to each other. Each of the bumps is elongated along a first direction that is predetermined and is along a substrate surface. The imaging device includes: a light emitting portion that emits light in a direction that is inclined relative to the substrate surface; an imaging portion that images the substrate surface onto which the light is emitted; and a direction adjusting portion that adjusts an arrangement relation between the direction in which the light is emitted and an orientation of the substrate to allow the first direction to become inclined relative to the direction in which the light is emitted, in a plan view. The imaging portion images the substrate while the first direction is inclined relative to the direction in which the light is emitted, in a plan view.

Further, an imaging method according to an aspect of the present disclosure is for imaging a substrate that includes a plurality of bumps arranged in parallel to each other. Each of the bumps is elongated along a first direction that is predetermined and is along a substrate surface. The imaging method includes: (A) a light emitting step that emits light in a direction that is inclined relative to the substrate surface; (B) an imaging step that images the substrate surface onto which the light is emitted; and (C) a direction adjusting step that adjusts an arrangement relation between the direction in which the light is emitted and an orientation of the substrate to allow the first direction to become inclined relative to the direction in which the light is emitted, in a plan view. The imaging step (B) images the substrate while the first direction is inclined relative to the direction in which the light is emitted, in a plan view.

If the configuration images a substrate that includes a plurality of bumps arranged in parallel to each other, and each of the bumps is elongated along a first direction that is predetermined and is along a substrate surface, the configuration adjusts an arrangement relation between a direction in which light is emitted and an orientation of the substrate to allow a direction along a long side of each of the bumps to become inclined relative to the direction in which light is emitted, in a plan view. Consequently, light is emitted onto the bumps in a direction that is inclined relative to the direction along a long side of each of the bumps, in a plan view. The emitted light that has been reflected is imaged. In that case, a length of a path of light between two bumps that are adjacent to each other is longer than a distance between bumps that are adjacent to each other, in a plan view. The length of a path of light has an effect that is substantially same as an effect of an increase in a distance between bumps that are adjacent to each other. Consequently, even if a substrate that includes a plurality of bumps arranged in parallel to each other is imaged, images in which spaces between the bumps are identified are easily captured.

Preferably, on the substrate surface, a plurality of bumps are also arranged in parallel to each other, and each of the bumps is elongated along a second direction that intersects with the first direction, and the direction adjusting portion adjusts an arrangement relation between the direction in which the light is emitted and an orientation of the substrate to allow an angle at which the first direction is inclined relative to the direction in which the light is emitted to become substantially equal to an angle at which the second direction is inclined relative to the direction in which the light is emitted, in a plan view.

The configuration emits light that is inclined at a substantially equal angle relative to both bumps elongated in the first direction and bumps elongated in the second direction, in a plan view. Consequently, images in which spaces between bumps are identified are easily captured for both the bumps elongated in the first direction and the bumps elongated in the second direction. Further, the bumps elongated in the first direction and the bumps elongated in the second direction are imaged with equal accuracy.

Preferably, the first direction is perpendicular to the second direction, and the direction adjusting portion adjusts an arrangement relation between the direction in which the light is emitted and an orientation of the substrate to allow the first direction to become inclined at an angle of substantially 45° relative to the direction in which the light is emitted, in a plan view.

The configuration emits light that is inclined at an angle of substantially 45° relative to both bumps elongated in the first direction and bumps elongated in the second direction, in a plan view. The emitted light that has been reflected is imaged.

Further, an imaging device according to an aspect of the present disclosure is for imaging a substrate that includes bumps that are on a substrate surface and are arranged at positions that correspond to points of intersection of a grid. The imaging device includes: a light emitting portion that emits light in a direction that is inclined relative to the substrate surface; an imaging portion that images the substrate surface onto which the light is emitted; and a direction adjusting portion that adjusts an arrangement relation between the direction in which the light is emitted and an orientation of the substrate to allow a diagonal direction that passes through diagonal positions of the grid to substantially correspond to the direction in which the light is emitted, in a plan view. The imaging portion images the substrate while the diagonal direction substantially corresponds to the direction in which the light is emitted, in a plan view.

Further, an imaging method according to an aspect of the present disclosure is for imaging a substrate that includes bumps that are on a substrate surface and are arranged at positions that correspond to points of intersection of a grid. The imaging method includes: (A) a light emitting step that emits light in a direction that is inclined relative to the substrate surface; (B) an imaging step that images the substrate surface onto which the light is emitted; and (C) a direction adjusting step that adjusts an arrangement relation between the direction in which the light is emitted and an orientation of the substrate to allow a diagonal direction that passes through diagonal positions of the grid to substantially correspond to the direction in which the light is emitted, in a plan view. The imaging step (B) images the substrate while the diagonal direction substantially corresponds to the direction in which the light is emitted, in a plan view.

If the configuration images a substrate that includes bumps that are on a substrate surface and are arranged at positions that correspond to points of intersection of a grid, the configuration adjusts an arrangement relation between a direction in which light is emitted and an orientation of the substrate to allow a diagonal direction that passes through diagonal positions of the grid to substantially correspond to the direction in which light is emitted, in a plan view. Consequently, light is emitted onto the bumps arranged at points of intersection of the grid in a direction that substantially corresponds to the diagonal direction of the grid, in a plan view. The emitted light that has been reflected is imaged. In that case, a length of a path of light between two bumps that are adjacent to each other is longer than a distance between bumps that are adjacent to each other on the grid, in a plan view. The length of a path of light has an effect that is substantially same as an effect of an increase in a distance between bumps. Consequently, even if a substrate that includes bumps arranged at positions that correspond to points of intersection of a grid is imaged, images in which spaces between the bumps are identified are easily captured.

Preferably, the imaging device described above further includes a rotatable support that rotates the substrate about a rotational axis that is perpendicular to the substrate surface, and the direction adjusting portion allows the rotatable support to rotate the substrate to adjust the arrangement relation between the direction in which the light is emitted and an orientation of the substrate.

The configuration allows the rotatable support to rotate a substrate to adjust an arrangement relation between a direction in which light is emitted and an orientation of the substrate. Consequently, a first direction that is a direction along a long side of each of bumps becomes inclined relative to the direction in which light is emitted, in a plan view. Therefore, the arrangement relation between the direction in which light is emitted and an orientation of the substrate is easily adjusted.

Preferably, the light has a shape like a belt and extends in the direction in which the light is emitted.

The configuration increases an area emitted by one emission of light. Therefore, a substrate is imaged more efficiently.

Preferably, the light is laser light.

The configuration easily emits light that has a high directivity that allows the light to be emitted in a direction.

Further, a bump inspection device according to an aspect of the present disclosure includes: one of the imaging devices described above; and an inspection controlling portion that inspects the plurality of bumps, based on images captured by the imaging portion.

The configuration allows a plurality of bumps to be inspected based on captured images in which spaces between the bumps are identified. Therefore, accuracy of inspection of bumps increases.

An imaging device, a bump inspection device, and an imaging method that are configured as described above allow images in which spaces between bumps are identified to be easily captured when the imaging device, the bump inspection device, and the imaging method are used to image a substrate that includes a plurality of bumps arranged in parallel to each other.

The present application claims priority to Japanese Patent Application No. 2017-140202 filed on Jul. 19, 2017. The present application incorporates contents of Japanese Patent Application No. 2017-140202. The above description of embodiments shows the concrete embodiments or examples to only clarify technical contents of the present disclosure. Therefore, the present disclosure is not limited to the concrete embodiments or examples. The scope of the disclosed embodiments is thus indicated by the appended claims and all changes which come within the meaning and range of equivalency of the claims are therefore intended to be embraced.

What is claimed is:

1. An imaging device for imaging a substrate that includes a plurality of bumps arranged in parallel to each other, each of the bumps being elongated along a first direction that is predetermined and is along a substrate surface, the imaging device comprising:
a light source configured to emit light in a direction that is inclined relative to the substrate surface;
an imaging camera that images the substrate surface onto which the light is emitted;
a rotatable support configured to hold and rotate the substrate about a rotational axis that is perpendicular to the substrate surface;
a motor operably configured to control the rotation of the rotatable support; and
a processor configured to control the motor so as to adjust an arrangement relation between the direction in which the light is emitted and an orientation of the substrate to allow the first direction to become inclined relative to the direction in which the light is emitted, in a plan view,
wherein the imaging camera images the substrate while the first direction is inclined relative to the direction in which the light is emitted, in the plan view.

2. The imaging device according to claim 1, wherein
on the substrate surface, the plurality of bumps are also arranged in parallel to each other, and each of the bumps is elongated along a second direction that intersects with the first direction, and
the processor is configured to control the motor so as to adjust the arrangement relation between the direction in which the light is emitted and the orientation of the substrate to allow an angle at which the first direction is inclined relative to the direction in which the light is emitted to become substantially equal to an angle at which the second direction is inclined relative to the direction in which the light is emitted, in the plan view.

3. The imaging device according to claim 2, wherein
the first direction is perpendicular to the second direction, and
the processor is configured to control the motor so as to adjust the arrangement relation between the direction in which the light is emitted and the orientation of the substrate to allow the first direction to become inclined at an angle of substantially 45° relative to the direction in which the light is emitted, in the plan view.

4. The imaging device according to claim 1, further comprising:
wherein the processor is configured to allow the rotatable support to rotate the substrate to adjust the arrangement relation between the direction in which the light is emitted and the orientation of the substrate.

5. The imaging device according to claim 1, wherein the light has a shape like a belt and extends in the direction in which the light is emitted.

6. The imaging device according to claim 1, wherein the light is laser light.

7. A bump inspection device comprising:
the imaging device according to claim 1; and
wherein the processor is further configured to inspect the plurality of bumps, comprising to determine whether the plurality of bumps is acceptable based on images captured by the imaging camera.

8. An imaging method for imaging a substrate that includes a plurality of bumps arranged in parallel to each other, each of the bumps being elongated along a first direction that is predetermined and is along a substrate surface, the imaging method comprising:
(emitting light in a direction that is inclined relative to the substrate surface;
imaging the substrate surface onto which the light is emitted; and
adjusting an arrangement relation between the direction in which the light is emitted and an orientation of the substrate to allow the first direction to become inclined relative to the direction in which the light is emitted, in a plan view,
wherein the imaging of the substrate while the first direction is inclined relative to the direction in which the light is emitted, in the plan view.

* * * * *